(12) United States Patent  (10) Patent No.: US 7,537,234 B2
McClellan  (45) Date of Patent: May 26, 2009

(54) MOTORCYCLE TOWING DEVICE

(76) Inventor: W. Thomas McClellan, 2680 Arbor Dr., Fort Lauderdale, FL (US) 33312

( * ) Notice: Subject to any disclaimer, the term of this patent is extended or adjusted under 35 U.S.C. 154(b) by 0 days.

(21) Appl. No.: 12/036,406

(22) Filed: Feb. 25, 2008

(65) Prior Publication Data

US 2008/0143077 A1 Jun. 19, 2008

Related U.S. Application Data (63) Continuation-in-part of application No. 11/325,709, filed on Jan. 5, 2006.

(51) Int. Cl.
  *B60P 3/077* (2006.01)
(52) U.S. Cl. ...................................... 280/402
(58) Field of Classification Search .................. 280/402
  See application file for complete search history.

(56) References Cited

U.S. PATENT DOCUMENTS

| | | | | |
|---|---|---|---|---|
| 1,371,588 A * | 3/1921 | Westlake | ..................... | 105/415 |
| 2,489,771 A * | 11/1949 | Gibson | ....................... | 280/402 |
| 3,520,556 A * | 7/1970 | Warner | ..................... | 280/406.2 |
| 3,744,689 A * | 7/1973 | Kjensmo | ..................... | 224/500 |
| 3,779,407 A * | 12/1973 | Gillem | ........................ | 414/563 |
| 3,822,898 A * | 7/1974 | Brownlie | ..................... | 280/402 |
| 4,243,243 A * | 1/1981 | Edmisten | ................. | 280/455.1 |
| 5,366,338 A | 11/1994 | Mortensen | | |
| 5,531,560 A | 7/1996 | Bartholomew | | |
| 5,620,197 A | 4/1997 | Howes | | |
| 5,674,044 A | 10/1997 | Ranes | | |
| 5,938,226 A | 8/1999 | Transchel | | |
| 5,984,339 A | 11/1999 | Guild | | |
| 6,099,012 A | 8/2000 | Mortimer | | |
| 6,244,813 B1 | 6/2001 | Cataldo | | |
| 6,352,401 B1 | 3/2002 | LeMay | | |
| 6,382,656 B1 * | 5/2002 | Johnson, Jr. | ................ | 280/506 |
| 6,651,996 B1 | 11/2003 | Allemang | | |
| 6,682,292 B2 | 1/2004 | Estes | | |

* cited by examiner

*Primary Examiner*—Paul N Dickson
*Assistant Examiner*—Daniel Yeagley
(74) *Attorney, Agent, or Firm*—Laurence A. Greenberg; Werner H. Stemer; Ralph E. Locher

(57) ABSTRACT

A motorcycle towing device includes a substantially vertical member and a substantially horizontal member being interconnected for supporting a motorcycle wheel. A support column is pivotably and releasably mounted on at least one of the members, such as with a removable hinge pin passing through holes in the support column and in brackets on the support column. A draw bar is connected to the support column for insertion into a receiver mounted on a vehicle and at least one shim is disposed between the draw bar and the receiver.

2 Claims, 6 Drawing Sheets

MOTORCYCLE TOWING DEVICE

CROSS-REFERENCE TO RELATED APPLICATION

This application is a Continuation-In-Part of co-pending U.S. application Ser. No. 11/325,709, filed Jan. 5, 2006.

BACKGROUND OF THE INVENTION

1. Field of the Invention

The invention relates to a motorcycle towing device to be connected to a vehicle which has a receiver for accepting a draw bar.

2. Description of the Related Art

U.S. Pat. No. 6,682,292 B2 to Estes shows a motorcycle carrier which has a yoke brace leading to the motorcycle frame and which tows the motorcycle backwards and lifts the motorcycle with a hydraulic jack.

U.S. Pat. No. 6,651,996 B1 to Allemang shows a hitch mounted vertical motorcycle stand, used for maintenance, and not intended or used for towing.

U.S. Pat. No. 6,352,401 B1 to LeMay shows a motorcycle carrier, which does not use a trailer hitch, is rigidly attached to the towing vehicle and has a screw driven elevating mechanism and a hinge within the apparatus, with the handle bar yoke being fixedly held.

U.S. Pat. No. 6,244,813 B1 to Cataldo shows a motorcycle towing device for towing a motorcycle backwards. The device includes a jackscrew elevator, hinging pivot bearings and wheel engagement arms. There is no illustration as to how the motorcycle is held securely vertically or how the front-end forks are secured in the device.

U.S. Pat. No. 6,099,012 to Mortimer shows a motorcycle hitch adapter for connecting to a receiver hitch, which has a rigidly attached horizontal channel, only limited vertical adjustability and a laterally mounted horizontal securing bar. The adapter is connected to the receiver at a detrimentally long distance. A less than axle height forward tire channel provides poor wheel control or containment. The non-secured loading ramp, if used as illustrated, would not be removable after motorcycle loading, because the short wheel space available would obstruct the removal of the long pin height. The vertical and parallel running straps, as opposed to a criss-crossing and triangular securement, especially when fastened to a bar which appears to be very lightweight, would seem to be inadequate even for the most lightweight towing. An effective three axis securing system for the tire, wheel and motorcycle front-end is not illustrated or described therein.

U.S. Pat. No. 5,984,339 to Guild shows a motorcycle towing apparatus, which does not use a standard drawbar trailer hitch, but instead a bolt attached through a horizontal plate. Using non-defined securing links leading to the bottom of the forks and long rigid side members secured to the aft of the motorcycle frame, transmits the entire towing, backing, braking and turning loads through the single attachment bolt.

U.S. Pat. No. 5,938,226 to Transchel shows a motorcycle tow hitch, using an up-sloped motorcycle position, loaded by a winch belt attached to a crank driven winch barrel, wound around a tire encircling separate element that encases and secures the tire. The hitch is rigid and not vertically adjustable and no further securing is illustrated or described.

U.S. Pat. No. 5,674,044 to Ranes shows an apparatus for towing motorcycles using a rigid mount without vertical adjustment. A metal wheel clamp with movable prongs is used to secure the front wheel. An adjustable up-sloped ramp is used to help retain the tire. No other securing devices are illustrated or described.

U.S. Pat. No. 5,620,197 to Howes shows a motorcycle towing device using a hydraulic ram operating a pivoting loading ramp with an attached front tire-retaining channel. Laterally radiating support arms are used for support but employ what appear to be flexible restraining straps. Its long length, weight, complexity and non-flexible ramp detract from easy use or true utility.

U.S. Pat. No. 5,366,338 to Mortensen shows a lift and tow motorcycle transporter, using a belt lifted carrier mounted on columns that traverse inside vertical members. No specific manner for securing the motorcycle is illustrated or described in any detail.

U.S. Pat. No. 5,531,560 to Bartholomew shows a motorcycle towing device which is actually described as a trailer. The back wheel or wheels of one or two motorcycles remain on the ground. This creates two flexible connections between the vehicle and the towed motorcycles, making control difficult and backing impossible. No method of securing is illustrated or described. The device has no discernable advantages over a simple trailer.

BRIEF SUMMARY OF THE INVENTION

It is accordingly an object of the invention to provide a motorcycle towing device, which overcomes the hereinafore-mentioned disadvantages of the heretofore-known devices of this general type and which locks a draw bar on the towing device to a receiver on the vehicle in a solid, noise-free and sway-free manner. In addition, the towing device should be pivotable and the major part of the towing device should be removable from the vehicle while leaving the draw bar attached. These features of the invention provide an improved hitch hinge connection which prevents oscillation, swaying and towing instability when towing a motorcycle on its own wheel.

With the foregoing and other objects in view there is provided, in accordance with the invention, a motorcycle towing device, comprising a substantially vertical member and a substantially horizontal member being interconnected for supporting a motorcycle wheel. A support column is pivotably and releasably mounted on at least one of the members. A draw bar is connected to the support column for insertion into a receiver mounted on a vehicle.

In accordance with another feature of the invention, two brackets are connected to the substantially vertical member, and a hinge pin passes through holes in the brackets and in the support column, for pivoting the substantially vertical member on the support column. The hinge pin is removable from the holes for removing the members from the vehicle while leaving the support column on the vehicle. Thus, there is provided an improved quick release between the support column and wheel attachment group for easy partial disassembly and removal for partial storage.

In accordance with a further feature of the invention, the draw bar has a given outer dimension being smaller than an inner dimension of the receiver, and at least one shim is disposed between the draw bar and the receiver. The at least one shim may have an L-shaped cross section. The L-shaped cross section may have shorter and longer legs and at least one of the legs may be folded substantially through 90°. An improved method for removing slack or looseness between the vehicle hitch receiver and the inserted hitch tongue or draw bar, is thus provided.

In accordance with an added feature of the invention, the substantially vertical member and the substantially horizontal member are U-shaped channels for holding the motorcycle wheel. Supports flexibly interconnect the substantially vertical and substantially horizontal members with play. Additional supports form double triangles flexibly interconnecting the substantially vertical and substantially horizontal members with play. The additional supports may have a ring for attachment of a line or tension strap leading to a motorcycle for stability. These features provide an improved, more rigid lateral support system for improved towing stability while still retaining good obstruction clearance.

In accordance with an additional feature of the invention, the substantially vertical and substantially horizontal members are movable between a folded condition and an unfolded condition. The substantially vertical and substantially horizontal members are substantially mutually perpendicular in the unfolded condition for supporting the motorcycle wheel and are substantially mutually parallel in the folded condition. This provides an improved wheel support channel hinge for obstruction clearance and quick, easy folding for temporary storage while still mounted on the vehicle.

In accordance with yet another feature of the invention, a ramp is provided with a surface for guiding the motorcycle wheel onto the substantially horizontal member and a tongue to be inserted into a slot formed in the substantially horizontal member. The tongue is long enough to bind against the substantially horizontal member in the slot when the ramp touches the ground.

In accordance with yet a concomitant feature of the invention, a locking pin is to be inserted through holes formed in the draw bar and corresponding holes in the receiver and optionally in the at least one shim.

The flexible hinge connection at the trailer hitch between the towing vehicle and the towed motorcycle is desirable because it reduces motorcycle leaning and lateral stresses during turns. Prior art hinged connections worsen towing instability because of the combination of increased hinge point displacement or distance from the vehicle turning center to the hinge, the low hitch height, the high motorcycle center of gravity, the round bottom of the tire and the short wheel base of the motorcycle. Due to the prior art rearward-displaced hinge position, the most minor variations of lateral turning or yaw movements in the towing vehicle are amplified, initially in the opposite direction, into intense vertical and lateral oscillations and instability in towed motorcycles.

The hinge's distance from the vehicle bumper must be kept to an absolute minimum. The position of the hinge of the invention reduces the length of the destabilizing separation and solves the problem by moving the hinge point as close as possible to the vehicle's bumper. This towing pivot point of the invention is placed not distal from or even close behind the vertical member but within the vertical support member. This is the most forward possible point to the vehicle's bumper with the shortest displacement arc and greatest possible stability. Moving the pivot point to this most forward position markedly enhances towing stability.

Prior art towing devices protrude significantly from the vehicle and cannot be left safely in place when not in use. The prior art towing devices are also welded or non-easily separated assemblies, which makes removal from the vehicle for storage an inconvenient all or none procedure.

In addition to the vertical hinge, described above for lateral turning, this new towing device also has a horizontally hinge-mounted front wheel attachment channel. This allows vertical flexing or movement of the wheel channel in case of grounding on driveway curbs or other elevations. Any carrying device that protrudes from the rear of a vehicle is susceptible to grounding or impact damage from uneven terrain. When crossing drainage culverts or markedly uneven surfaces, such as when pulling out of sloping parking lots, the rear of some vehicles contact the ground normally and any device that protrudes farther could be severely damaged. The bottom or horizontal U-shaped tire and wheel receiving channel or member of the motorcycle carrier is constructed with a hinged attachment to the matching vertical U-shaped channel of the carrier and is further affixed with flexing lateral supports. This flexible connection and the non-rigid method of attaching the motorcycle to the carrier, allows the aft section of the bottom channel and the mounted tire and wheel to move vertically without impairment or damage. The distal end of the wheel attachment channel can flex upward to relieve pressure from an obstruction.

This horizontally hinged vertical flexing channel is also conveniently adapted for complete folding and fitment against the vertical channel, when the motorcycle is not mounted, as a temporary storage configuration while the motorcycle towing device is still in place on the vehicle. This enhanced temporary storage option is a very useful improvement.

The vertically hinged towing device according to the invention can be easily sub-divided into two separate pieces for convenient partial storage. The steel vertical support column and hitch tongue or draw bar can be left in place while the lighter aluminum folding front wheel attachment channel assembly can be quickly separated by removing the long hinge pin which locks the two element groups together. This single pin passes inside the support column, securely locking both the upper and lower pivot hinges simultaneously. The strong vertical support column can be left installed in the trailer hitch carrier, giving added protection to the rear bumper, while protruding less than a typical trailer hitch. The lighter and collapsible front wheel attachment channel assembly is easily folded and placed in the garage or trunk for partial storage or convenient carry. Complete removal and total storage is an additional third option. Operational ease and storage is greatly improved.

Prior art towing devices frequently use long, low, laterally-running, poorly-supported, stabilizer bars extending from the trailer hitch. Those bars, because of their natural flexing, do not control the lateral swaying or instability of the motorcycle and more importantly do not allow any upward wheel movement in case of grounding. The improved lateral support system according to the invention provides improved stabilizing to the motorcycle and still allows vertical movement of the wheel mount channel for obstructions. These new lateral supports are formed of opposing double triangles on each side of the motorcycle towing device, have three widely separated attachment points and allow much greater strength and rigidity than any prior art single beam support structure. They also preserve the upward flexibility of the horizontal tire support channel in case of grounding, because the third support point is mounted on and can move with the upward moving wheel channel. The three elements on each side are held to the hitch in a three-point array with pushpins or other suitable fasteners and are easily installed or removed. The elements are formed of one inch stainless steel tubing and terminals or other suitable material and their outer support connections are held to the motorcycles' upper fork area by suitable tension straps. Towing stability and safety are markedly improved thereby.

Prior art motorcycle towing devices have towing instability or looseness caused by the misfit, slack or space between the hitch carrier and the tongue of the hitch ball or hitch device. The more simplified, one-piece, improved shimming device according to the invention removes the slack or space between the carrier or hitch receiver and the towing device tongue or draw bar. Any slack, play or looseness in this fitment is magnified during towing as swaying, lateral, vertical or longitudinal instability in the towed object, accompanied by clicking, clunking, jerking and noises in the hitch assembly.

The asymmetric, 90° folded and contoured variable-thickness shims of metal or other suitable material according to the invention are self-aligning due to their matching folds and fitment with the two inch square tongue and receiver structure. The shims are also self-retaining due to their 90° terminal lips which are held in place by the device's vertical column or hitch structure. Due to their asymmetry, they can be used on any two diagonal sides of the slide-in hitch tongue or draw bar individually or diagonally as opposed matching pairs and in the necessary combinations of thickness or numbers to remove any slack, play or looseness between the hitch tongue or draw bar of the towing device and the hitch carrier. Towing stability is markedly improved thereby.

Other features which are considered as characteristic for the invention are set forth in the appended claims.

Although the invention is illustrated and described herein as embodied in a motorcycle towing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2, 3, 4, 5:
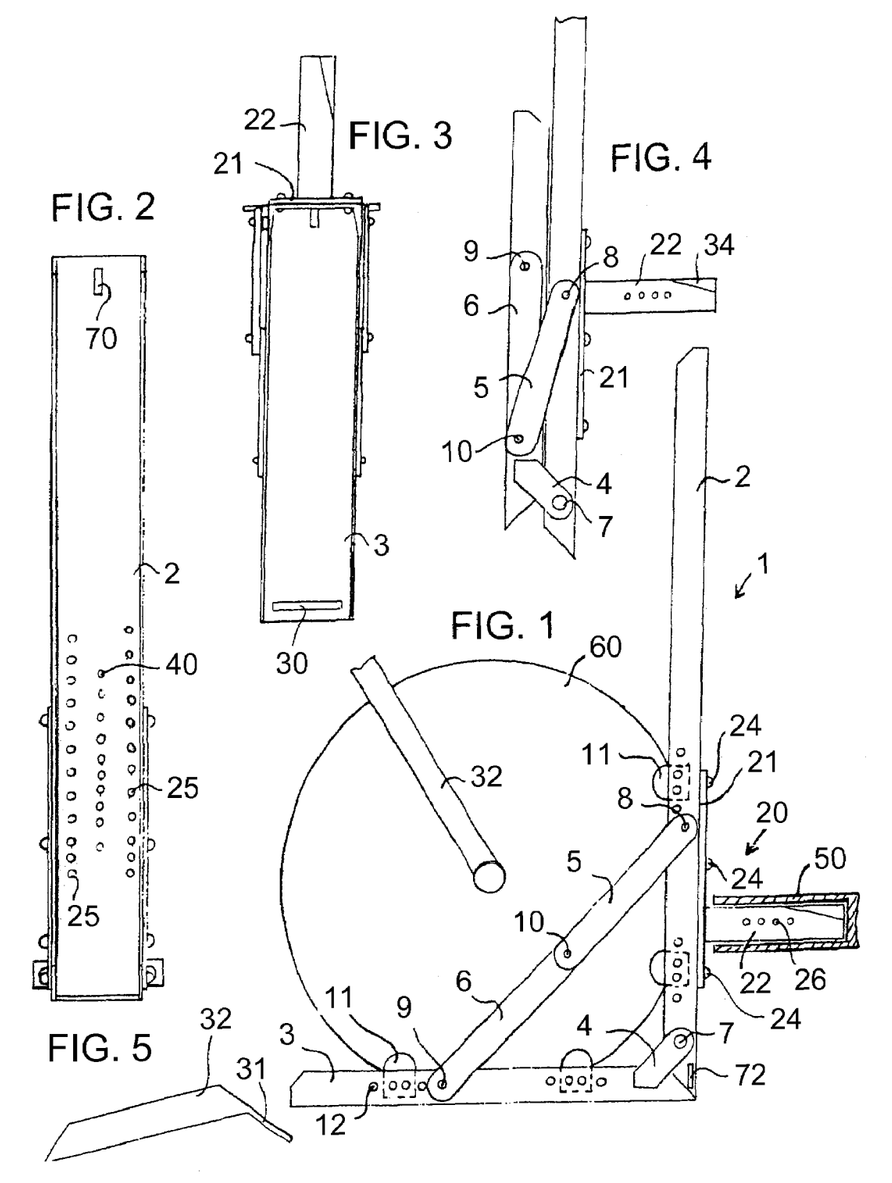
FIG. 1 is a fragmentary, diagrammatic, side-elevational view of a motorcycle towing device according to the invention with a draw bar and backing plate combination and supporting a front wheel of a motorcycle on channels and between tire cradles.
FIG. 2 is a front-elevational view of the device of the invention in an unfolded condition.
FIG. 3 is a top-plan view of the device of the invention in the unfolded condition.
FIG. 4 is a fragmentary, side-elevational view of the device of the invention in a folded condition.
FIG. 5 is a side-elevational view of a ramp of the device of the invention.

Referring now to the figures of the drawings in detail and first, particularly, to FIG. 1 thereof, there is seen a motorcycle towing device 1 having a vertical member such as a U-shaped channel 2 and a horizontal member such as a U-shaped channel 3. Flexible lateral supports 4, 5 and 6 are connected between the channels 2, 3. A lower end of the support 4 is fixedly connected to the horizontal channel 3 while an upper end of the support 4 is connected to the vertical channel 2 at a pivot point 7. An upper end of the support 5 is connected to the vertical channel 2 at a pivot point 8, while a lower end of the support 6 is connected to the horizontal channel 3 at a pivot point 9. The supports 5, 6 are interconnected at a pivot point 10. A front wheel 60 of a motorcycle is disposed in both channels 2, 3 and is supported on a front wheel mounting fork 61.

It is understood that the members or channels 2, 3 need not be exactly vertical and horizontal, respectively, but instead an approximately or substantially vertical and horizontal orientation is sufficient as long as it can hold the wheel 60 in place. The supports provide a "flexible" connection between the members or channels 2, 3 with play so that if the bottom of the member or channel 3 strikes the ground, it will simply move upwards rather than being rigid, to avoid damage to the towing device.

Figure 16:
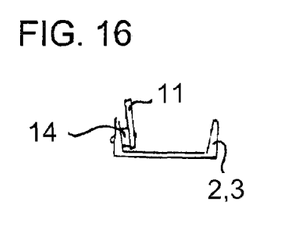
FIG. 16 is an end-elevational view of the device of the invention with a channel and a tire cradle.
Figure 17:
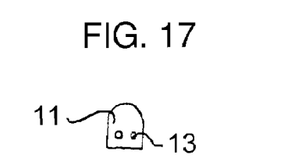
FIG. 17 is a side-elevational view of a tire cradle of the device of the invention.

The motorcycle wheel 60 is also held between four pairs of tire cradles or guides 11 seen in FIGS. 1, 16 and 17. Two of the pairs of tire cradles or channel extensions 11 are disposed on each of the channels 2, 3, although only one cradle of each pair is shown in FIG. 1. The cradles 11 are adjustable along the channels by bolting them through holes 12 in the channels and holes 13 in the cradles. The cradles 11 are adjustable transversely to the channels by using different sized or amounts of washers 14.

Figure 12:
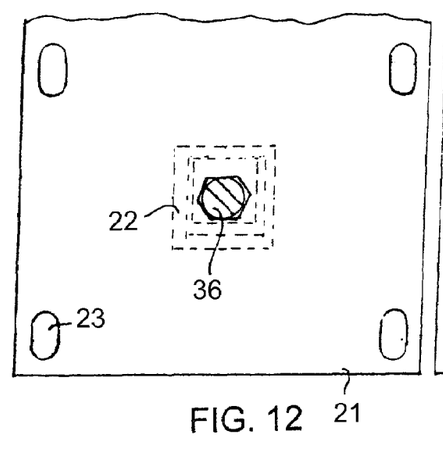
FIG. 12 is a further enlarged, fragmentary, front-elevational view of the draw bar and backing plate combination of the device of the invention.
Figure 13:
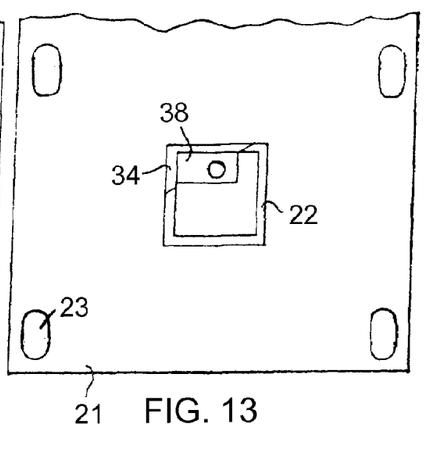
FIG. 13 is a fragmentary, rear-elevational view of the draw bar and backing plate combination of the device of the invention with a wedge retracted.

A combination 20 of a backing plate 21 and a draw bar 22 is provided for connecting the motorcycle towing device 1 to a vehicle. The backing plate 21 has two vertical rows of slotted mounting holes 23 formed therein. Each vertical row has three holes 23 for receiving mounting bolts 24. The slotted mounting holes 23 are best seen in FIGS. 12 and 13, although only two holes 23 are shown in each vertical row in those fragmentary views. The bolts 24 pass through the holes 23 into threaded holes 25 disposed in two vertical rows in the vertical member or channel 2 as is seen in FIG. 2. Therefore, the backing plate 21 can be adjusted in height by simply selecting the holes 25 into which the bolts 24 are screwed. The fact that the holes 23 are slotted permits precise height adjustment of the motorcycle wheel 60.

The draw bar 22 is provided for attachment to a receiver 50 which is permanently connected to a vehicle to be used for pulling the motorcycle towing device 1. Both the draw bar 22 and the receiver 50 have holes formed therein, although only the holes 26 are shown. It is noted that the holes 26 and the holes in the draw bar could also be vertical. A locking pin 27 shown in FIG. 6 has spring-loaded projections 28 and a hole 29 for a non-illustrated pull ring. The locking pin 27 is forced through the holes 26 in the draw bar 22 are the corresponding holes in the receiver 50 causing the projections 28 be retracted and then extended to lock the draw bar 22 to the receiver 50. The locking pin 27 is removed by pulling on the pull ring in the hole 29. It is important to note that the draw bar 22 can be completely drawn into the receiver 50 with virtually no space remaining and no intervening mechanism, for reducing lateral sway of the motorcycle towing device 1 to a minimum.

FIG. 3 shows that the horizontal member or channel 3 has a slot 30 formed therein for receiving a tongue 31 of a ramp 32 shown in FIG. 5. The slot is centrally located in the channel 3 and the tongue 31 is sufficiently long to prevent the ramp 32 from tipping toward one side when rolling the wheel 60 from the ground onto the channel 3. The tongue 31 is also long enough to bind and be "locked" against the substantially horizontal member or channel 3 in the slot 30 when the ramp 32 touches the ground.

The folded condition of the motorcycle towing device 1 is shown in FIG. 4. it can be seen that by merely lifting up on horizontal channel 3, the supports 4, 5, 6 pivot on the pivot points 7-10 for compact stowage of the motorcycle towing device 1 on the vehicle with the draw bar 22 attached to the receiver 50. Of course, the motorcycle towing device 1 can also be removed from the vehicle for stowage in a trunk or interior of a vehicle or building in the folded condition.

Figures 6, 9:
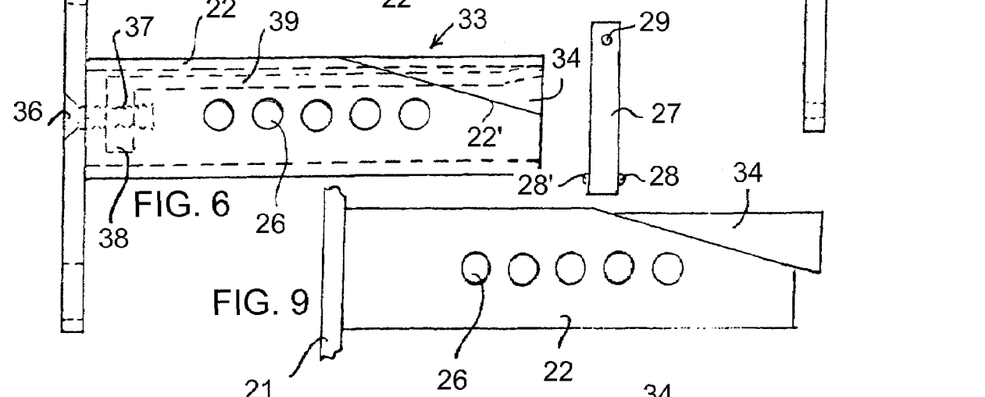
FIG. 6 is an enlarged, side-elevational view of the draw bar and backing plate combination of the device of the invention.
FIG. 9 is a fragmentary, side-elevational view of the draw bar and backing plate combination of the device of the invention with the wedge in a loosened condition.
Figures 7, 8:
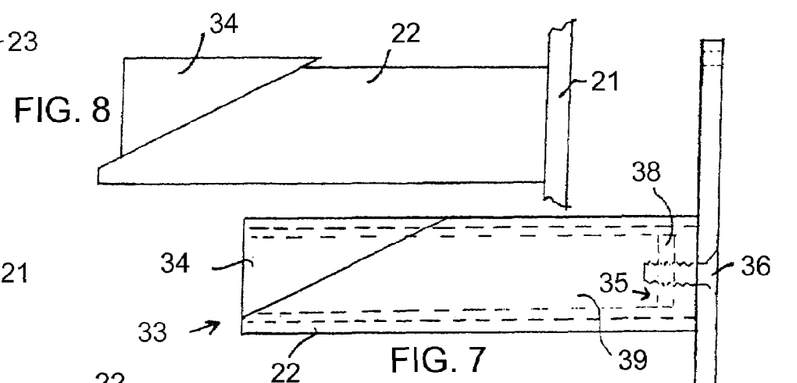
FIG. 7 is a top-plan view of the draw bar and backing plate combination of the device of the invention.
FIG. 8 is a fragmentary, top-plan view of the draw bar and backing plate combination of the device of the invention with a wedge in a tightened condition.
Figure 14:
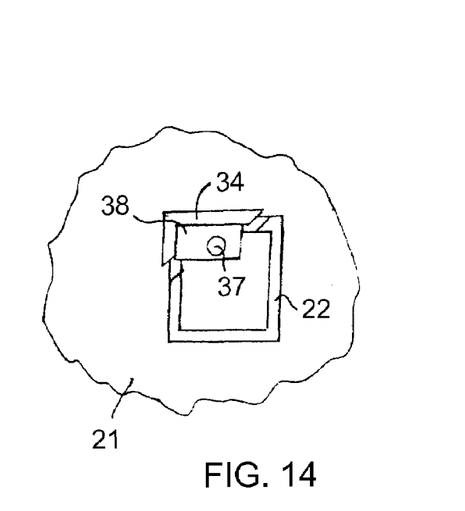
FIG. 14 is a fragmentary, rear-elevational view of the draw bar and backing plate combination of the device of the invention with the wedge extended in two orthogonal directions.

FIGS. 6 and 7 show that the draw bar 22 has a wedging system 33 including a projection which is preferably a two-sided triangular wedge 34, an L-shaped bracket 35 fixedly connected to the wedge 34 and an adjusting screw 36. The adjusting screw 36 is screwed into a threaded hole 37 in a short leg 38 of the L-shaped bracket 35. A long leg 39 of the L-shaped bracket 35 is connected to the wedge 34, such as by welding. Access holes 40 formed in vertical member or channel 2, as seen in FIG. 2, permit adjustment of the screw 36 by a screw driver or a ratchet from within the vertical channel 2. FIG. 12 shows a front view of the combination 20 of the backing plate 21 and the draw bar 22, in which the adjusting screw 36 can be seen as though looking from the left in FIG. 6 or the right in FIG. 7. FIG. 13 shows the backing plate 21 and the draw bar 22 from the rear, that is from the right in FIG. 6 and from the left in FIG. 7. The draw bar 22 has a given outer dimension being smaller than an inner dimension of the receiver 50 so that the draw bar can slide into the receiver. It can be seen from FIG. 14 that the projection or wedge 34 has been extended both horizontally and vertically beyond the given outer dimension of the draw bar to contact and grip two inner surfaces of the receiver 50 in two orthogonal directions. This has been accomplished by turning the adjusting screw 36 clockwise to pull the L-shaped bracket 35 and thus the wedge 34 toward the left in FIG. 6 so that it rides along a ramp surface 22' of a main section of the draw bar 22. In order to loosen the wedge for removal from the receiver, the screw 36 is simply turned counter-clockwise. Of course, any projection which can be selectively extended beyond the given outer dimension of the draw bar in just one direction will contact the receiver. However, a wedge contacting the receiver in two directions is preferred for a more stable and quieter connection.

Figure 10:
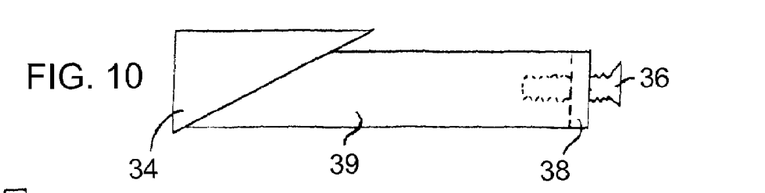
FIG. 10 is a top-plan view of a bracket and the wedge of the device of the invention separated from the draw bar and the backing plate.
Figure 11:
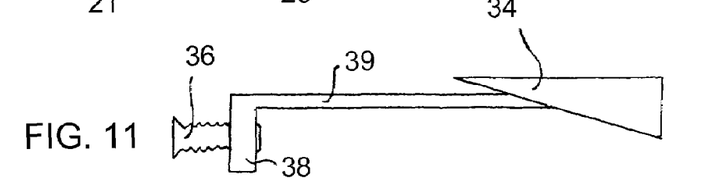
FIG. 11 is a side-elevational view of the bracket and the wedge of the device of the invention separated from the draw bar and the backing plate.

FIG. 8 shows the combination 20 of the backing plate 21 and the draw bar 22 after the wedge 34 has been tightened against the ramp surface 22' by the screw 36. FIG. 9 shows the combination 20 of the backing plate 21 and the draw bar 22 after the wedge 34 has been loosened along the ramp surface 22' by the screw 36. FIGS. 10 and 11 show the wedge 34 and the bracket 39 separated from the draw bar and the backing plate, from the top and the side.

It can also be seen from the side view of FIG. 6 that the draw bar 22 is not centrally, but rather vertically eccentrically, located along the height of the backing plate 21. Therefore, the height of the draw bar above the ground is adjustable by simply mounting the draw bar as shown in FIG. 6 or rotating it through 180°. This makes it possible to ensure that the proper towing height of the front wheel of the motorcycle at six inches above the ground can be accomplished, whether being towed by a relatively high or low vehicle.

Figure 15:
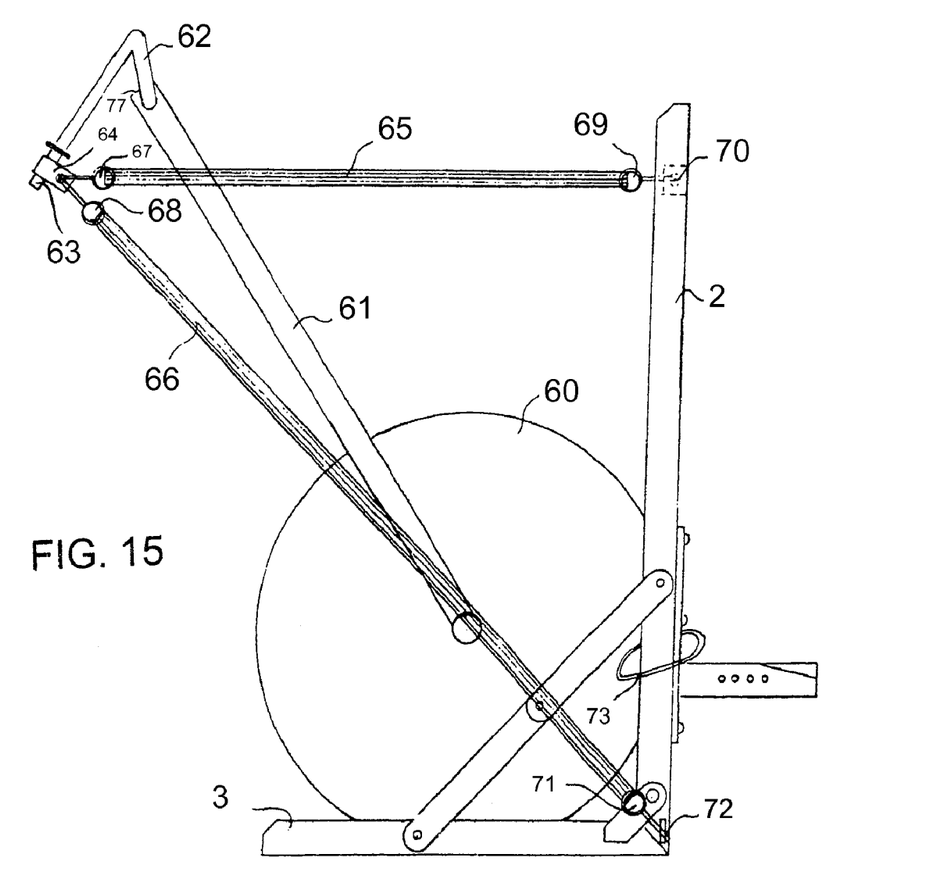
FIG. 15 is a view similar to FIG. 1 of the device of the invention having a securing harness, but in which the tire cradles have been omitted for the sake of clarity.

FIG. 15 illustrates a handgrip securing harness in which the members or channels 2 and 3 holding the front wheel 60 of the motorcycle are shown. One of two handlebars 62 is shown as being attached to the front wheel mounting fork 61. Handgrips 63 are each disposed at the end of a respective handlebar 62. According to the invention, a respective sleeve 64 is placed over each handgrip 63 and ratcheting cargo straps 65, 66 are attached to the sleeves 64 at self-tightening loops 67, 68. The other end of the cargo strap 65 has a self-tightening loop 69 connected to an upper attachment point 70. The other end of the cargo strap 66 has a self-tightening loop 71 connected to a lower attachment point 72. It is understood that other, non-illustrated cargo straps and self-tightening loops connect the other handlebar to the attachment points 70, 72 for stability. FIG. 15 also shows a safety tie 73 which extends through the rim of the wheel 60 and around the vertical member or channel 2.

Figure 18:
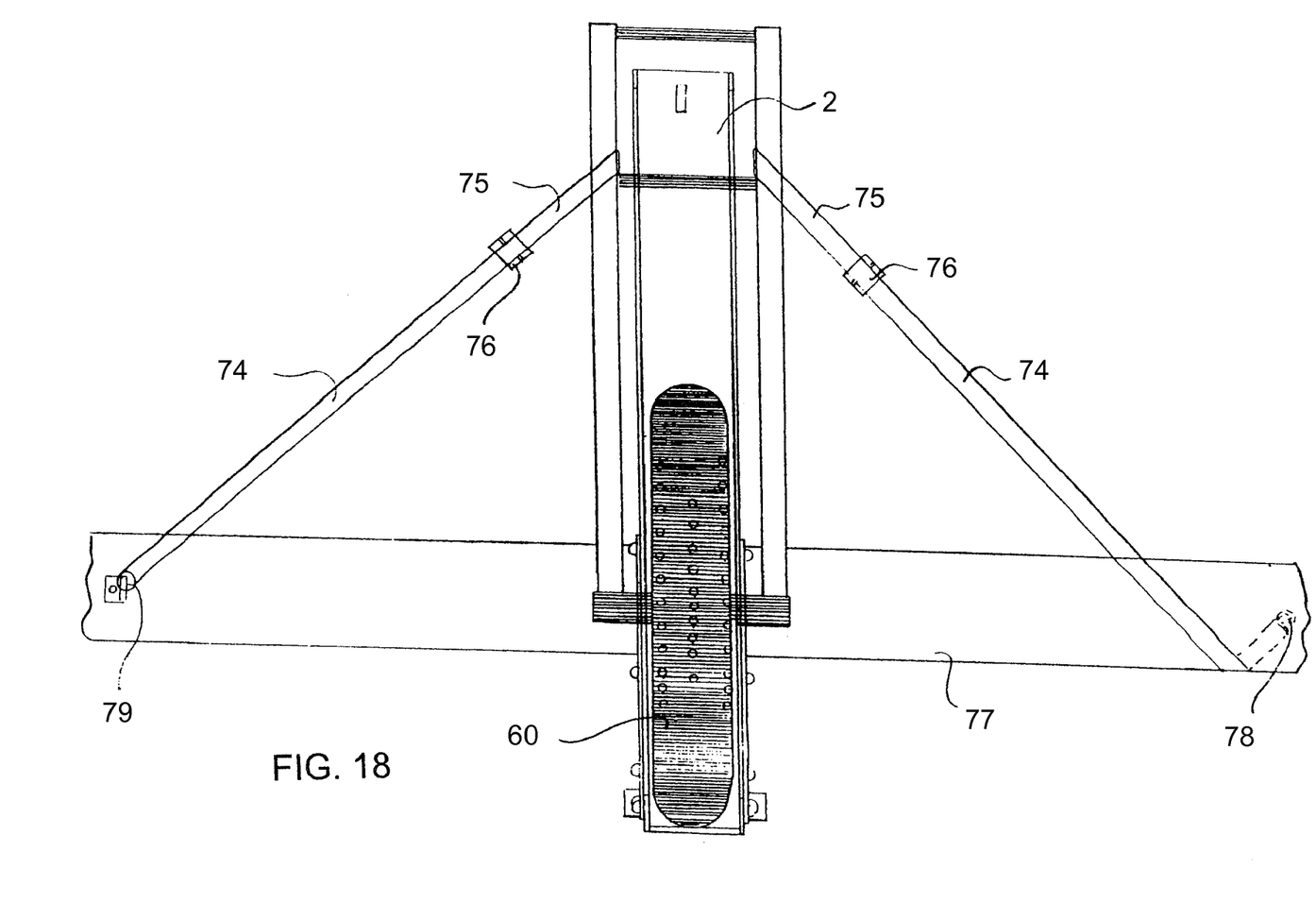
FIG. 18 is a front-elevational view of the device of the invention with a motorcycle wheel and security frame straps connected to a vehicle bumper.

As is seen in FIG. 18, frame straps or webbings 74 have endless or continuous self-tightening loops 75 at one end which are secured to the top of the motorcycle forks. The other ends of the frame straps 74 are secured laterally with ratchet snuggers at or below a bumper 77 of a vehicle used for pulling the motorcycle towing device 1. In one version, shown at the right in FIG. 18, the strap is wrapped where it passes below the bumper and is attached to a spring-locking metal hook 78 on the frame of the vehicle. In another version, shown at the left in FIG. 18, the strap terminates at a spring-locking metal clip 79 for connection to an external, right-angled, attachment point mounted at the bumper surface and connected to the frame and bumper braces. These configurations provide additional strength, safety and sway control for larger motorcycles.

Figures 19, 20, 21A, 21B, 21C, 21D, 21E, 21F, 21G:
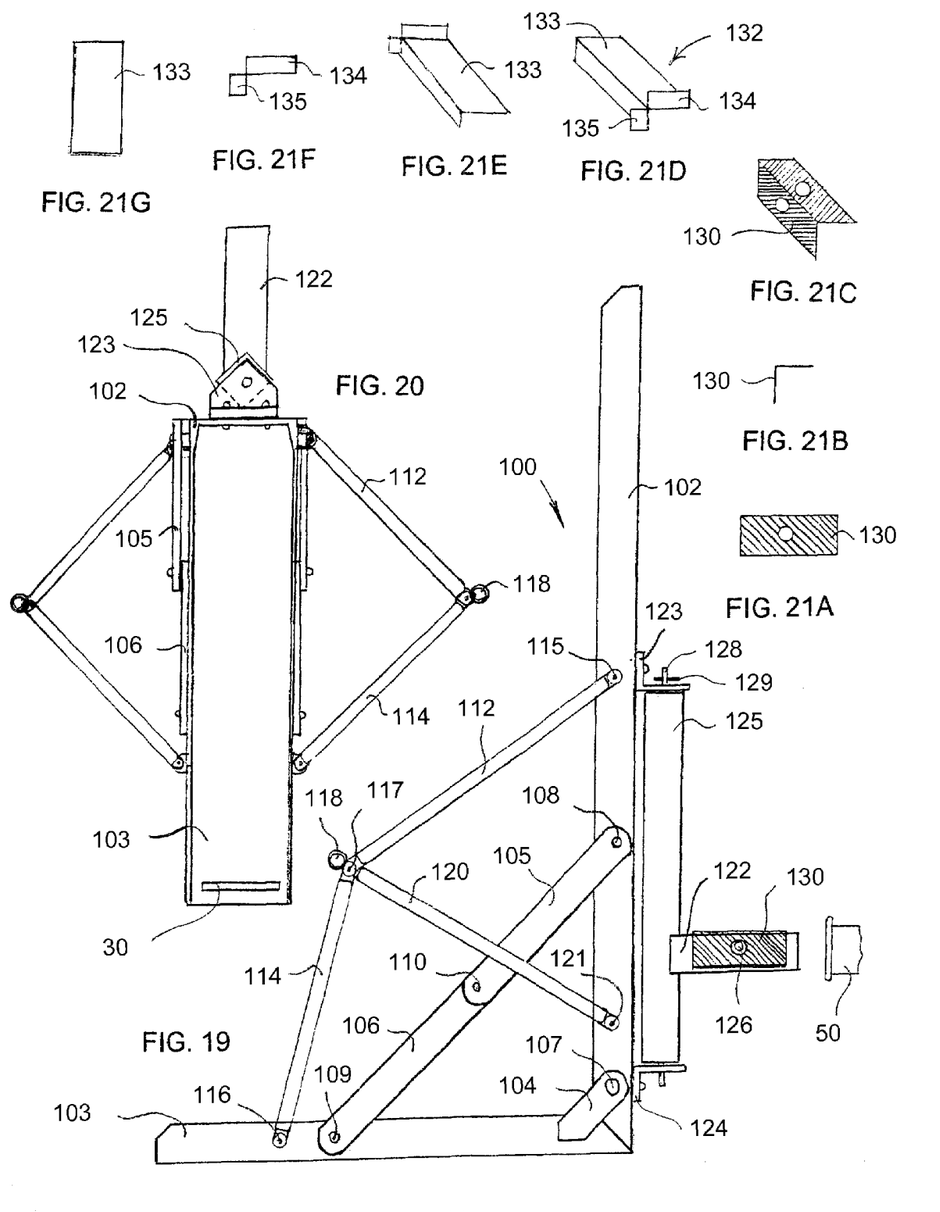
FIG. 19 is a fragmentary, side-elevational view of a second embodiment of a motorcycle towing device according to the invention with a pivotable support column, a shim for the draw bar and opposing double triangles for supporting a front wheel of a motorcycle on channels.
FIG. 20 is a top-plan view of the device of FIG. 19 in the unfolded condition.
FIGS. 21A-21G are respective side-elevational, end-elevational, perspective, perspective, perspective, end-elevational and top-plan views of different embodiments of the shims of the invention.

FIGS. 19 and 20 are respective side-elevational and top-plan views of a second embodiment of the invention, in which there is seen a motorcycle towing device 100 having a vertical member such as a U-shaped channel 102 and a horizontal member such as a U-shaped channel 103. Flexible lateral supports 104, 105 and 106 are connected between the channels 102, 103. A lower end of the support 104 is fixedly connected to the horizontal channel 103 while an upper end of the support 104 is connected to the vertical channel 102 at a pivot point 107. An upper end of the support 105 is connected to the vertical channel 102 at a pivot point 108, while a lower end of the support 106 is connected to the horizontal channel 103 at a pivot point 109. The supports 105, 106 are interconnected at a pivot point 110. It may be seen from FIG. 20 that the supports 105, 106 are disposed on both sides of the device 100.

It may also be seen from FIGS. 19 and 20 that additional lateral supports 112, 114 are connected to the channels 102, 103. More specifically, an upper end of the support 112 is connected to the vertical channel 102 at a pivot point 115, while a lower end of the support 114 is connected to the horizontal channel 103 at a pivot point 116. The supports 112, 114 are interconnected at a pivot point 117. It may be seen from FIG. 20 that the supports 112, 114 are disposed on both sides of the device 100 and have a ring 118 for attachment of a line or tension strap leading to a motorcycle for added stability. A center support 120 is connected between the pivot point 117 and a pivot point 121 on the vertical channel 102, forming double triangles with the supports 112, 114 on both sides of the device 100. The pivot points 115, 116, 121 provide three widely separated attachment points for greater strength and stability. Pushpins or other easily removable fasteners are provided for the supports at the pivot points 115, 116, 121.

Two L-shaped brackets 123, 124 are bolted to the vertical channel 102 at vertically spaced-apart locations. A support tube or column 125, which is disposed between the brackets 123, 124, carries a draw bar or tongue 122 to be inserted into the receiver or carrier 50 of a trailer hitch mounted on a vehicle. A hinge pin 128 extends through holes passing through the brackets 123, 124 and the support column 125 to permit the channels 102, 103 to pivot relative to the support column 125 having the draw bar 122. The hinge pin 128 has a stop 129, such as a cotter pin, disposed near the upper end thereof, permitting the hinge pin 128 to be removed upwardly but preventing the hinge pin 128 from falling out downwardly. Removal of the hinge pin 128 allows the device 100 to be separated into two parts, with the elements 122, 125 remaining on the vehicle and the elements 102-121 being removable for storage in a vehicle or a building. The brackets 123, 124 could also be bolted to the horizontal channel 103 or they could each be connected to a respective one of the channels, for accommodating a much shorter support column 125 therebetween. The draw bar 122 would be connected to the shorter support column 125.

An L-shaped shim 130 is placed over the draw bar 122 before the draw bar is inserted into the receiver 50, to eliminate play between the draw bar and the receiver. Concentric holes 126, which could be horizontal or vertical, are formed in the draw bar 122, in the shim 130 and in the receiver 50, although only the holes 126 in the draw bar and the shim are shown. The locking pin 27 shown in FIG. 6 is used for locking the draw bar 22, the shim 130 and the receiver 50 together through the holes. The shim 130, which has been shown with hatching in FIG. 19 for clarity, is also shown in side-elevational, end-elevational and perspective views in FIGS. 21A, 21B and 21C. The shims may have contours, wedge-shaped cross sections, otherwise variable thicknesses, folds or surface roughness or contouring or multiple shims may be used, in order to eliminate play between the draw bar and the receiver. Since the support column 125 and the draw bar 122 may remain on the vehicle, as a bumper guard, without the remainder of the device 100, the proper size, shape and number of shims need only be placed between the draw bar and the receiver once.

FIGS. 21D-21G show an alternative embodiment of a shim 132, having an L-shaped body 133 with cut and folded edges 134, 135. Once again, more than one shim 132 may be used and the shim itself may have contours, wedge-shaped cross sections, otherwise variable thicknesses, folds or surface roughness or contouring in order to eliminate play between the draw bar and the receiver.

The invention claimed is:

1. A motorcycle towing device, comprising:
   a substantially vertical member and a substantially horizontal member being interconnected for supporting a motorcycle wheel;
   supports flexibly interconnecting said substantially vertical and substantially horizontal members with play;
   additional supports forming double triangles flexibly interconnecting said substantially vertical and substantially horizontal members with play;
   a support column pivotably and releasably mounted on at least one of said members; and
   a draw bar connected to said support column for insertion into a receiver mounted on a vehicle.

2. The motorcycle towing device according to claim 1, wherein said additional supports have a ring for attachment of a line or tension strap leading to a motorcycle for stability.

* * * * *